| United States Patent [19] | [11] 4,074,622 |
|---|---|
| Niemeyer | [45] Feb. 21, 1978 |

[54] APPARATUS FOR THE CONTINUOUS PRODUCTION OF STANDARDIZED MILK

[75] Inventor: Heinrich Niemeyer, Oelde, Germany

[73] Assignee: Westfalia Separator AG, Oelde, Germany

[21] Appl. No.: 678,589

[22] Filed: Apr. 20, 1976

[30] Foreign Application Priority Data

Apr. 23, 1975 Germany .............................. 2517938

[51] Int. Cl.² .......................... A23C 9/00; A23C 13/02
[52] U.S. Cl. ...................................... 99/456; 426/231; 426/491; 426/580; 426/586
[58] Field of Search ............... 426/231, 491, 580, 478, 426/586; 99/452, 456

[56] References Cited

U.S. PATENT DOCUMENTS

| 2,567,898 | 9/1951 | Staatt | 426/231 |
| 3,961,570 | 6/1976 | Sanden | 99/452 |

OTHER PUBLICATIONS

Standardization of Milk to a Required Fat Content, Westfalia Separator AG./4740 Oelde 1 (W. Germand, 10/1972, pp. 1–24).

Gates, W. C. J., Standardization–A Plain Man's Guide, Dairy Industries, July 1973 (pp. 324–328).

*Primary Examiner*—David M. Naff
*Attorney, Agent, or Firm*—Burgess, Dinklage & Sprung

[57] ABSTRACT

Continuous production of standardized milk is carried out with a method and apparatus wherein milk is separated into cream and skimmilk, an amount of cream is remixed with skimmilk to produce standardized milk, the standardized milk is continuously tested for fat content, the amount of cream remixed with the skimmilk is automatically regulated in accordance with the fat content of the standardized milk and standardized milk and separated cream are recycled to milk being separated if fat content of the standardized milk is not within prescribed limits.

4 Claims, 1 Drawing Figure

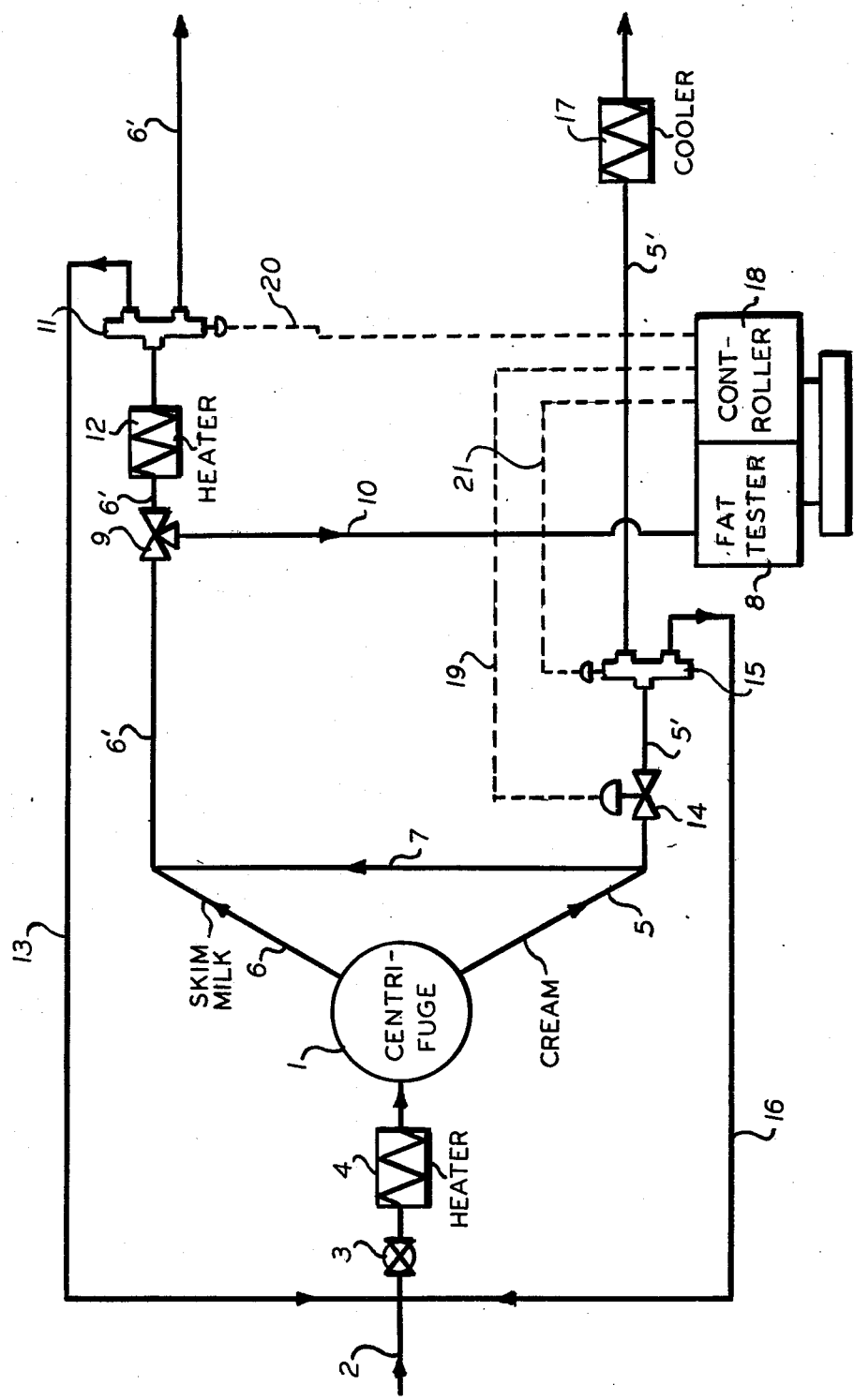

APPARATUS FOR THE CONTINUOUS PRODUCTION OF STANDARDIZED MILK

BACKGROUND

The invention relates to a method and an apparatus for the continuous production of standardized milk having a predetermined fat content from raw milk of higher fat content, in which the rate of flow of the cream flowing from a cream separating centrifuge and being remixed with the skim milk is regulated in accordance with the fat content of the standardized milk, and the excess cream is carried off separately.

A method of this kind is known from Westfalia publication No. 2315/466 "Reinigung und Standardisierung von Milch mit Westfalia Doppelgreifer-Separatoren".

In this known method, the raw milk as supplied, with a higher constant fat content, is separated in a cream separating centrifuge into cream and skim milk and the portion of the cream that is needed for the fat content of the standardized whole milk is remixed with the skim milk by means of a system of piping and valves located outside of the centrifuge, and the excess cream is carried off separately.

The apparatus for the practice of the known method consists of a cream separating centrifuge to which the raw milk is delivered with a constant fat content, at a constant rate of flow through a flow limiter, and from which both the skim milk and the cream are pumped under pressure, by means of a paring disk for example, into its discharge lines.

For the purpose of maintaining the quantity ratio between the cream and the skim milk, a flow meter is installed in the cream discharge line, and in order to mix a portion of the cream with the skim milk, the two discharge lines are connected together by a branch line equipped with a regulating valve.

The rate of flow of the excess cream is measured by an additional flow meter and is adjusted with a cream control valve following the flow meter in the circuit.

The amount of cream to be carried off in the known method is calculated on the basis of the rate of flow and fat content of the raw milk input to the centrifuge, and of the fat content of the cream emerging from the centrifuge. The greater the number of fat units per unit of time that are fed to the centrifuge, the greater the number of fat units will be which must be withdrawn separately from the process. This means that not only must the rate of flow and fat content of the raw milk input be constant, but also the fat content of the cream and the amount of cream to be discharged separately must be precisely adjusted and held constant.

If, however, the fat content of the raw milk is variable, the methods known hitherto do not suffice for the production of standardized milk with a very precisely controlled fat content. In Germany, for example, the fat content of standardized whole milk must be at least 3.5% according to law, and it must not fall below this level. To exceed this fat content, however, represents a loss for the dairy, which for this reason desires to produce standardized milk with a very precisely controlled fat content.

If, for example, the fat content of standardized milk is to amount to 3.5%, a maximum fat content of 3.55% will be allowed by the dairy. Since the butterfat content must not, according to law, fall below 3.5%, the butterfat tolerance will amount to ± 0.025%. If, for example, 100,000 liters of milk are sold with 3.55% butterfat instead of 3.5% butterfat, the loss to the dairy will be 5,000 units of fat, corresponding to approximately 60 kg of butter.

In the centrifugal milk separators, the preset ratio of skim milk to cream and the fat content in the skim milk remain constant, even when the fat content of the cream varies. In this case, regulation through rate-of-flow measurement, as described in the beginning, is no longer possible.

THE INVENTION

It is the object of the invention to produce a standarized milk having a very precise, predetermined butterfat content, from a raw milk of variable butterfat content, and to return wrongly proportioned standardized milk back into the process, for the purpose of minimizing the dairy's loss of butterfat units.

The method of the invention is characterized in that the standardized milk is continuously sampled and the amount of cream that is to be remixed with the skim milk is automatically regulated in accordance with the butterfat content of the samples, and the excess cream and the refatted skim milk are recycled into the process if they differ excessively from the prescribed levels.

In this manner it is brought about that a standardized milk of precisely determined and controlled butterfat content is produced from raw milk of variable fat content and variable throughput. All sources of error, such as those which can occur in the proportioning operation, are determined, and the standardized milk and excess cream are recycled to the process through controllable valves until the prescribed butterfat content has been precisely established in the standardized milk.

The apparatus for the performance of the process is characterized by the fact that, for the periodical sampling of the standardized milk, a valve is produced in the standardized milk discharge line and is connected by a pipe to an apparatus for determining butterfat content, which transmits the determined values to an automatic control which compares the determined value with the preset prescribed value, and which accordingly regulates a regulating valve in the cream discharge line and actuates two-way valves provided in the discharge lines to produce recirculation whenever the fat content of the standardized milk differs appreciably from the prescribed level. Since the determination of the butterfat content in the test apparatus requires a few seconds, it is desirable to dispose the valve for recycling the standardized milk into the process at such a distance from the point of withdrawal of the specimen from the standardized discharge line that the pipeline capacity between said point of withdrawal and the changeover valve will be equal to the volume of standardized milk produced in the interval of time required for determining the fat content.

Thus, the invention provides a process for the continuous production of standardized milk having a predetermined fat content for raw milk having a higher fat content. The cream is separated from the raw milk providing separated cream and skim milk, and a portion of the seperated cream is remixed with the skim milk. The amount of said portion is regulated to provide the desired predetermined fat content of the standardized milk, and the balance of the cream is withdrawn from the process. In such operation, the amount of cream in the standardized milk is periodically outside of preselected tolerances. According to the invention, to allow for that, the skim milk is sampled and the fat content thereof is determined, and the amount of the cream portion remixed with the skim milk is regulated, as in the previous practice. Additionally, however, when the amount of cream is outside of the preselected tolerances, standardized milk which is outside of the tolerances and about the corresponding amount of said balance of the cream, is recycled to upstream of the remixing step. The recycled streams can be combined and the resulting combined stream can be introduced into the separating step.

The apparatus of the invention comprises a separator for separating the raw milk into separated cream and skim milk and having an inlet line for feeding of raw milk to the separator, a first discharge line for separated cream, and a second discharge line for skim milk. A by-pass line interconnects the discharge lines for conveying a portion of the separated cream to the skim milk for remixing of cream with skim milk to provide the standardized milk in the second discharge line. A regulating valve is installed in the first discharge line downstream of the by-pass line for proportioning the amount of cream remixed with the skim milk. Means are provided for continuously withdrawing a sample of the standardized milk from the second discharge line.

A two-way valve is mounted in the first discharge line downstream of the regulating valve mounted therein, for receiving separated cream. The two-way valve has two outlets. A conduit connects with one of the outlets for discharge of separated cream from the process. Another two-way valve is mounted in the second discharge line downstream of the connection of the sampling means to the second discharge line. This valve also has two outlets and a conduit is connected to one of the outlets for discharge of standardized milk from the process. A recycle conduit is connected to each of the second outlets of the two two-way valves and leads to upstream of the mixing of separated cream and skim milk for recycling of separated cream and standardized milk to the process.

The apparatus includes a fat tester and controller for receiving the withdrawn sample and determining the fat content thereof. The tester and controller is effective to control the regulator valve in the first discharge line, and to control the two-way valves for discharge of separated cream and standardized milk when the fat content of the standardized milk is within preselected tolerances, and recycling separated cream and standardized milk to the process when the fat content of the standardized milk is outside of the selected tolerances. The recycle conduits can lead to the inlet line of the separator.

The invention is illustrated diagrammatically in the drawing which represents an embodiment thereof.

The cream separating centrifuge is identified as 1, a rate of flow limiter or valve 3 and a heater 4 being disposed in the line 2 feeding the centrifuge. The cream discharge line 5 is connected by a by-pass line 7 to the skim milk discharge line 6. The buttermilk content testing apparatus 8 is connected by a line 10 to the sampling valve 9 disposed in the standardized milk line 6'. A heat exchanger 12 is provided in line 6' between valve 9 and a pneumatically operated two-way valve 11. A line 13 is a recycling line for the standardized milk, e.g., leads back to the centrifuge; line 16 is a recycle line for the cream. In the cream discharge line 5' there are provided a regulating valve 14, a pneumatically operated two-way valve 15 with a recycling line 16, and a cooler 17. An automatic controller associated with the fat content testing apparatus 8 is connected by lines 19, 20 and 21 to the regulating valve 14 and the two-way valves 11 and 15.

The process operates as follows: The raw milk of variable butterfat content is fed through a rate of flow limiter 3, then warmed by a heater 4 and delivered to the centrifuge 1. The separation of the raw milk into cream and skim milk takes place in the centrifuge 1. A portion of the removed cream is returned to the skim milk through the by-pass line 7, the amount of cream that is added being controlled automatically by valve 14. The excess cream is carried off through line 5', the cream being cooled in the cooler 17.

Samples are continually taken at 9 from the standardized milk in line 6' and tested for fat content in the butterfat testing apparatus 8. The desired fat content of the standardized milk is preset in the automatic controller 18, in which a continuous comparison is made between the preset and tested fat contents. The regulating valve 14 is adjusted accordingly by the automatic controller 18, and thus the rate of flow of the excess cream is regulated, it being desirable to make an approximate preadjustment of the regulating valve 14 to the desired fat content of the standardized milk before starting operation. Accordingly, the automatic controller 18 is merely preset to the desired fat content of the standardized milk, disregarding the fat content of the raw milk being put in.

In the lines carrying the standardized milk 6' and the excess cream 5' there are installed two-way valves 11 and 15, which are connected to the automatic controller 18 and thus also to the testing apparatus 8. If the butterfat content determined by the fat content testing apparatus 8 in the standardized milk is not the desired and preset butterfat content, the standardized milk and the excess cream are recycled to the process through the two-way valves 11 and 15 and lines 13 and 16 and into the input line 2, i.e., they are recycled to the centrifugal separator 1. When the fat content has been restored to standard, the reversal of valves 11 and 15 again takes place automatically.

As mentioned, since the determination of the butterfat content in the test apparatus requires a few seconds, it is desirable to dispose the valve 11 for recycling the standardized milk into the process at such a distance from the point of withdrawal of the specimen from the standardized milk discharge line, i.e., the valve 9, that the pipeline capacity between the valve 9 and the changeover valve 11 will be equal to the volume of standardized milk produced in the interval of time required for determining the fat content.

What is claimed is:

1. Apparatus for the continuous production of standardized milk having a predetermined fat content from raw milk having a variable and higher fat content which comprises:

a. a separator for separating the raw milk into separated cream and skim milk and having an inlet line for feeding of raw milk to the separator, a first discharge line for separated cream, and a second discharge line for skim milk, b. a by-pass line interconnecting said discharge lines for conveying a portion of the separated cream to the skim milk for remixing of cream with the skim milk to provide standardized milk in the second discharge line, and a regulating valve mounted in one of said lines for said separated cream for proportioning the amount of cream remixed with the skim milk,
c. means for withdrawing a sample of the standardized milk from the second discharge line, which means is connected with the second discharge line,
d. a first two-way valve in the first discharge line downstream of the by pass line for receiving cream not remixed with the skim milk and having a first outlet and a second outlet, a conduit connected to the first outlet for discharge of separated cream from the process,
e. a second two-way valve in the second discharge line downstream of the connection of the sampling means to the second discharge line, having a first outlet and a second outlet, a conduit connected to the first outlet of the second two-way valve for discharge of standardized milk from the process,
f. a recycle conduit connected to each of the second outlets of the two two-way valves for recycling of separated cream and standardized milk to the separator,
g. a fat test and controller for receiving the withdrawn sample and determining the fat content thereof and effective to control the regulator valve, and to control the two-way valves for discharge of separated cream and standardized milk when the fat content of the standardized milk is within preselected tolerances and recycle separated cream and standardized milk to the separator when the fat content of the standardized milk is outside of the preseclected tolerances.

2. Apparatus of claim 1, wherein the two-way valve in the second discharge line is disposed downstream of the connection of the sampling means to the second discharge line and at such a distance from the connection of the sampling means to the second discharge line, that the volume of the second discharge line between said connection of the sampling means and the two-way valve is equal to the volume of standardized milk produced in the time span of the fat content determination by the fat tester.

3. Apparatus of claim 1, wherein the regulating valve is disposed in the first discharge line downstream of the bypass line.

4. Apparatus of claim 1, wherein the regulating valve is disposed in the first discharge line downstream of the bypass line, the two way valve in the first discharge line is mounted downstream of the regulating valve, and the two way valve in the second discharge line is disposed downstream of the connection of the sampling means in the second discharge line, and wherein the two-way valve in the second discharge line is disposed at such a distance from the connection of the sampling means to the second discharge line, that the volume of the second discharge line between said connection of the sampling means and the two-way valve is equal to the volume of standardized milk produced in the time span of the fat content determination by the fat tester.

* * * * *